United States Patent
Park (10) Patent No.: US 12,013,833 B2
(45) Date of Patent: Jun. 18, 2024

(54) BLOCKCHAIN-BASED HIGH-SPEED DATA PROCESSING DEVICE AND METHOD THEREOF

(71) Applicant: K4-security.co., Ltd, Seoul (KR)

(72) Inventor: Kyoung Chul Park, Gimpo-si (KR)

(73) Assignee: K4-security.co., Ltd, Seoul (KR)

( * ) Notice: Subject to any disclaimer, the term of this patent is extended or adjusted under 35 U.S.C. 154(b) by 0 days.

(21) Appl. No.: 17/974,026

(22) Filed: Oct. 26, 2022

(65) Prior Publication Data

US 2024/0104078 A1    Mar. 28, 2024

(30) Foreign Application Priority Data

Sep. 28, 2022   (KR) .................. 10-2022-0123759

(51) Int. Cl.
*G06F 16/22*   (2019.01)
*G06F 16/23*   (2019.01)

(52) U.S. Cl.
CPC ...... *G06F 16/2282* (2019.01); *G06F 16/2246* (2019.01); *G06F 16/2358* (2019.01)

(58) Field of Classification Search
CPC ............. G06F 16/2282; G06F 16/2246; G06F 16/2358
See application file for complete search history.

(56) References Cited

U.S. PATENT DOCUMENTS

| | | | |
|---|---|---|---|
| 10,885,022 B1* | 1/2021 | Tian | .................... G06F 16/2379 |
| 2020/0167345 A1* | 5/2020 | Zhuo | .................... G06F 16/2379 |
| 2020/0242103 A1* | 7/2020 | Paduroiu | ............. G06F 16/2282 |
| 2021/0081373 A1 | 3/2021 | Tian | |
| 2021/0097043 A1 | 4/2021 | Xiao | |

FOREIGN PATENT DOCUMENTS

| | | |
|---|---|---|
| CN | 109684334 A | 4/2019 |
| CN | 109726206 A | 5/2019 |
| CN | 112988761 A | 6/2021 |
| WO | 2020/258856 A1 | 12/2020 |
| WO | 2021/174499 A1 | 9/2021 |

OTHER PUBLICATIONS

Stephen Martin, "Combined Search And Examination Report for GB Application No. GB2304089.2", Sep. 21, 2023, IPO, UK.

\* cited by examiner

*Primary Examiner* — Kannan Shanmugasundaram
(74) *Attorney, Agent, or Firm* — Bridgeway IP Law Group, PLLC; Jihun Kim (57) ABSTRACT

Proposed are a blockchain-based high-speed data processing device and a method thereof, which can manage data in a data structure format that can maximize performance when a blockchain system processes data. According to an embodiment, when <Key>:<Value> is stored, the final value is stored in a Log Structured Merge (LSM) tree data structure format, and the key used for storing the final value is separately stored in a B+ Tree data structure format, so that storage performance and reference (read) performance can be improved compared to those of conventional methods.

2 Claims, 7 Drawing Sheets

BLOCKCHAIN-BASED HIGH-SPEED DATA PROCESSING DEVICE AND METHOD THEREOF

BACKGROUND OF THE INVENTION

Field of the Invention

The present invention relates to a data processing technique, and more particularly, to a blockchain-based high-speed data processing device and a method thereof, which can manage data in a data structure format that can maximize performance when a blockchain system processes data.

Background of the Related Art

A database used by a blockchain system uses a LevelDB, which is called as a K-V (Key-Value) DB, rather than a relational database (RDBMS) used in the existing systems.

The LevelDB refers to a database created by combining Key and Value as a pair to be stored and referenced in a speedy way.

When the LevelDB is applied to a blockchain system, a block ID is set as the Key, and a value corresponding to the Value specifies a block information value corresponding to the block ID. Therefore, a block value stored in the blockchain may be referenced in a speedy way on the basis of the block ID.

When the Key-Value (K-V) DB stores K-V pairs in a file, the K-V pairs are stored in a tree-type data structure format, and almost all LevelDBs store data in a B+ tree format that is generally and frequently used.

The B+ tree data structure is a structure generally and most frequently used as a data storage structure of a commercial relational database such as MySQL or Oracle, as well as the file system of Windows OS, and it is known as a method capable of storing a lot of data efficiently.

However, when the storage performance (write speed) and reference performance (read speed) are considered, it is known that efficiency of performance is lowered to $O(n\log n)$ as the number of stored data increases.

Since data of blockchain is not deleted and only append-only operations are performed, performance of the LevelDB is inevitably lowered as the block increases, and since the LevelDB stacks blocks in a B+ Tree data structure, it can be determined that efficiency of performance is abruptly lowered in proportion to the efficiency ($O(\log N)$ for writing, $O(\log N)$ for reading) of the B+ Tree.

SUMMARY OF THE INVENTION

Therefore, the present invention has been made in view of the above problems, and it is an object of the present invention to provide a blockchain-based high-speed data processing device and a method thereof, which do not affect the efficiency of performance even when data increases as the data is processed by utilizing a data structure for maximizing performance in a blockchain system.

The technical problems to be solved by the present invention are not limited to the technical problems mentioned above, and unmentioned other technical problems can be clearly understood by those skilled in the art from the following description.

To accomplish the above object, according to one aspect of the present invention, there is provided a blockchain-based high-speed data processing device.

The blockchain-based high-speed data processing device according to an embodiment of the present invention may include a key management unit for managing the key of a <key>:<value> pair; and a value management unit for managing the value of the <key>:<value> pair.

According to another aspect of the present invention, there is provided a blockchain-based high-speed data processing method, and a computer program for executing the method.

The blockchain-based high-speed data processing method according to an embodiment of the present invention and the computer program for executing the method may include the steps of: reading configuration information for driving; confirming whether a WAL file of an Active state exists; confirming whether a WAL file of an Immutable state exists; and driving a Flush channel.

DETAILED DESCRIPTION OF THE PREFERRED EMBODIMENT

Since the present invention can be diversely modified and may have various embodiments, specific embodiments are illustrated in the drawings and will be described in detail through the detailed description. However, it should be understood that this is not intended to limit the present invention to the specific embodiments, but to include all modifications, equivalents, and substitutes included in the spirit and scope of the present invention. When it is determined in describing the present invention that a detailed description of related known techniques may unnecessarily obscure the gist of the present invention, the detailed description will be omitted. In addition, singular expressions used in this specification and claims should be generally interpreted to mean "one or more" unless mentioned otherwise.

Hereinafter, preferred embodiments of the present invention will be described in detail with reference to the accompanying drawings, and in describing with reference to the accompanying drawings, the same reference numerals are given to the same or corresponding components, and duplicated description thereof will be omitted.

The blockchain system is not a relational database (RDBMS) used in the existing systems, but applies a Key-Value DB constructed to quickly store and reference keys and values by binding them as a <Key>:<Value> pair. When the <Key>:<Value> pair is stored, the Key-Value DB generally stores data in a B+ Tree data structure format.

When the Key-Value is stored in the blockchain system, a blockchain-based high-speed data processing device 10 according to an embodiment of the present invention stores the final value in a Log Structured Merge (LSM) tree data structure format, and separately stores the key used for storing the final value in a B+ Tree data structure format, so that storage performance and reference (read) performance can be improved compared to those of the conventional methods.

Figure 1:
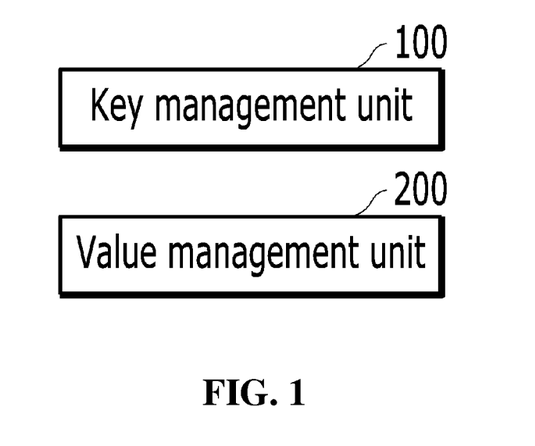
FIGS. 1 and 2 are views for explaining a blockchain-based high-speed data processing device according to an embodiment of the present invention.
Figure 2:
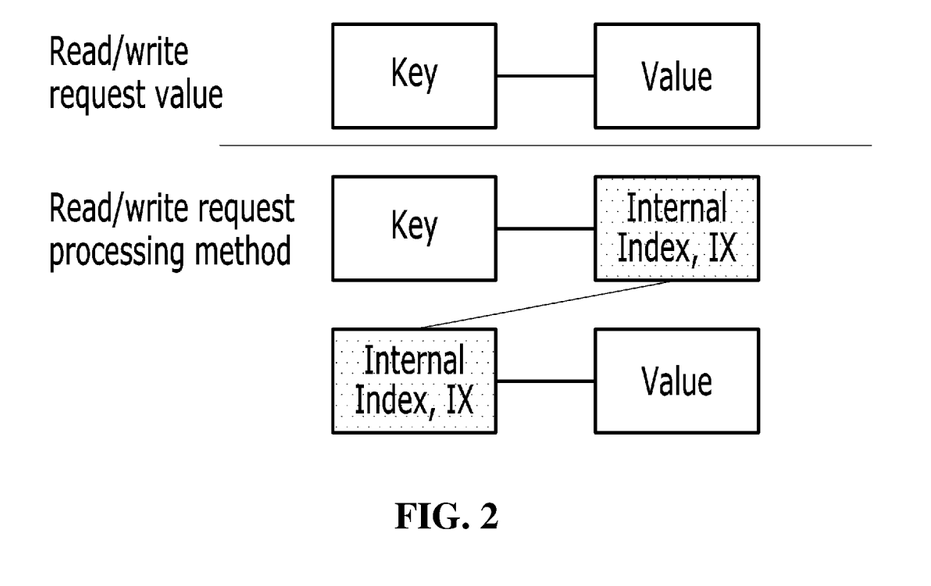

FIGS. 1 and 2 are views for explaining a blockchain-based high-speed data processing device according to an embodiment of the present invention.

Referring to FIG. 1, the blockchain-based high-speed data processing device 10 may include a key management unit 100 and a value management unit 200.

The key management unit 100 may manage the Key of the <Key>:<Value> pair. The key management unit 100 may store the Key in a B+ Tree data structure format. The key management unit 100 may register (store) the Key and an index (Internal indeX, IX) in a Direct Key Index (DKI) file to search for the Key in a speedy way. The key management unit 100 may search for the internal index (IX) for the <Key> in a speedy way in a <Key>:<Value> read process.

The value management unit 200 may manage the Value of the <Key>:<Value> pair.

The value management unit 200 may store the Value in a Log Structured Merge (LSM) tree data structure format. For example, the value management unit 200 may store the Value in a Value Log file.

The blockchain-based high-speed data processing device 10 may register <Key>:<Index (IX, Internal indeX)> in a DKI file. For example, the DKI file may be in a B+ Tree data structure format.

The blockchain-based high-speed data processing device 10 may register the <Index (IX, Internal indeX)> in a Value Index file. For example, the Value Index file may be in a B+ Tree data structure format.

The blockchain-based high-speed data processing device 10 may store the <Value> in a Value Log file. For example, the Value Log file may be a log file of a Log-Structured Merge (LSM) tree data structure format.

The blockchain-based high-speed data processing device 10 may find Index (IX) information from the DKI file using an input Key, find location information of the Value from the Value Index file using the Index (IX) information, and inquire the Value from the Value Log file using the location information of the Value.

When a Key is input to inquire a Value, the blockchain-based high-speed data processing device 10 finds the Key from the DKI file (Direct Key Index file) of a B+ Tree file structure. The blockchain-based high-speed data processing device 10 may acquire location information (Fid, Offset, EntrySize) of a Value corresponding to the Key found from the Log file. The blockchain-based high-speed data processing device 10 may inquire a Value in a corresponding data structure by finding a Log file corresponding to the acquired file id (Fid), calculating an offset of a predetermined method in the Log file, and reading data as much as the EntrySize.

Referring to FIG. 2, the blockchain-based high-speed data processing device 10 may register <Key>:<Internal indeX (IX)> in a Direct Key Index file (DKI file), and inquire the Value in a speedy way by reading the Internal indeX (IX) for the key in a <Key>:<Value> read process. For example, the Internal indeX (IX) may include location information (Fid, Offset, EntrySize) of a Value corresponding to the Key.

The blockchain-based high-speed data processing device 10 may maintain information in any one state among Active, Immutable, and Flushed in the process of writing and reading <Key>:<Value>. The blockchain-based high-speed data processing device 10 may redundantly store and maintain the same data in a WAL file and a MEMTable on the memory in the process of writing and reading <Key>:<Value>.

The blockchain-based high-speed data processing unit 10 may set the MEMTable and the WAL file of an Active state in a predetermined size so that a real-time input value of <Internal indeX (IX)>:<Value> may be used for writing/reading.

The blockchain-based high-speed data processing device 10 registers the MEMTable and the WAL file in an Immutable MEMTable and sets them as an Immutable state when the set size of the MEMTable of an Active state reaches full.

The blockchain-based high-speed data processing device 10 may delete the MEMTable and the WAL file of an Immutable state after asynchronously transferring data to the Value Index file and the Value Log file.

The blockchain-based high-speed data processing device 10 may store the Value in the Value Log file of a Flushed state, and store the Entry, which is search information of the Value, in the Value Index file together with the index (IX).

FIGS. 3 to 8 are exemplary views showing a blockchain-based high-speed data processing method and a structure thereof according to an embodiment of the present invention. Each process described below is a process performed in each step by each functional unit constituting the blockchain-based high-speed data processing device. However, for the sake of concise and clear explanation of the present invention, the subject of each step is collectively referred to as a blockchain-based high-speed data processing device.

Figure 3:
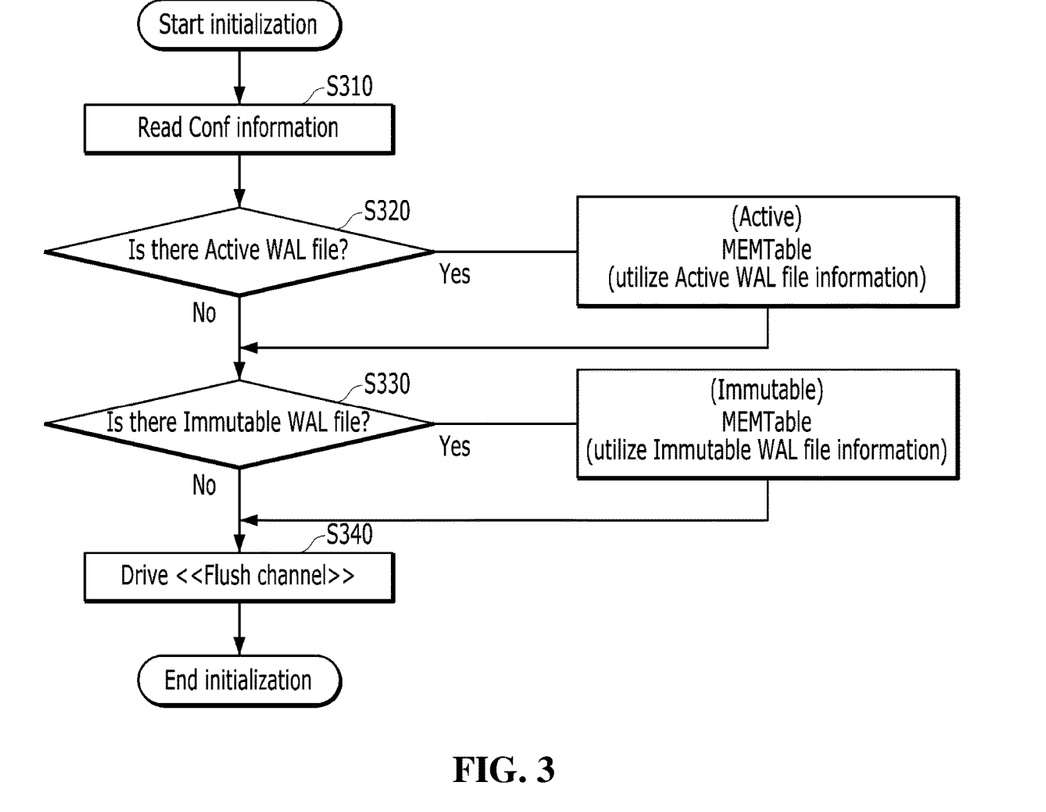
FIGS. 3 to 8 are exemplary views showing a blockchain-based high-speed data processing method and a structure thereof according to an embodiment of the present invention.

Referring to FIG. 3, the blockchain-based high-speed data processing device 10 may perform an initialization operation for driving a blockchain system.

At step S310, the blockchain-based high-speed data processing device 10 reads configuration information for driving the blockchain system.

At step S320, the blockchain-based high-speed data processing device 10 may grasp existence of a WAL file of an Active state. When there is a WAL file of an Active state, the blockchain-based high-speed data processing device 10 may create a MEMTable of an Active state by utilizing information on the WAL file of an Active state. When there is no WAL file of an Active state, the blockchain-based high-speed data processing device 10 performs step S330.

At step S330, the blockchain-based high-speed data processing device 10 may confirm existence of a WAL file of an Immutable state. When there is a WAL file of an Immutable state, the blockchain-based high-speed data processing device 10 may create a MEMTable of an Immutable state by utilizing information on the WAL file of an Immutable state. When there is no WAL file of an Immutable state, the blockchain-based high-speed data processing device 10 performs step S340.

At step S340, the blockchain-based high-speed data processing device 10 may drive a Flush channel.

Figure 4:
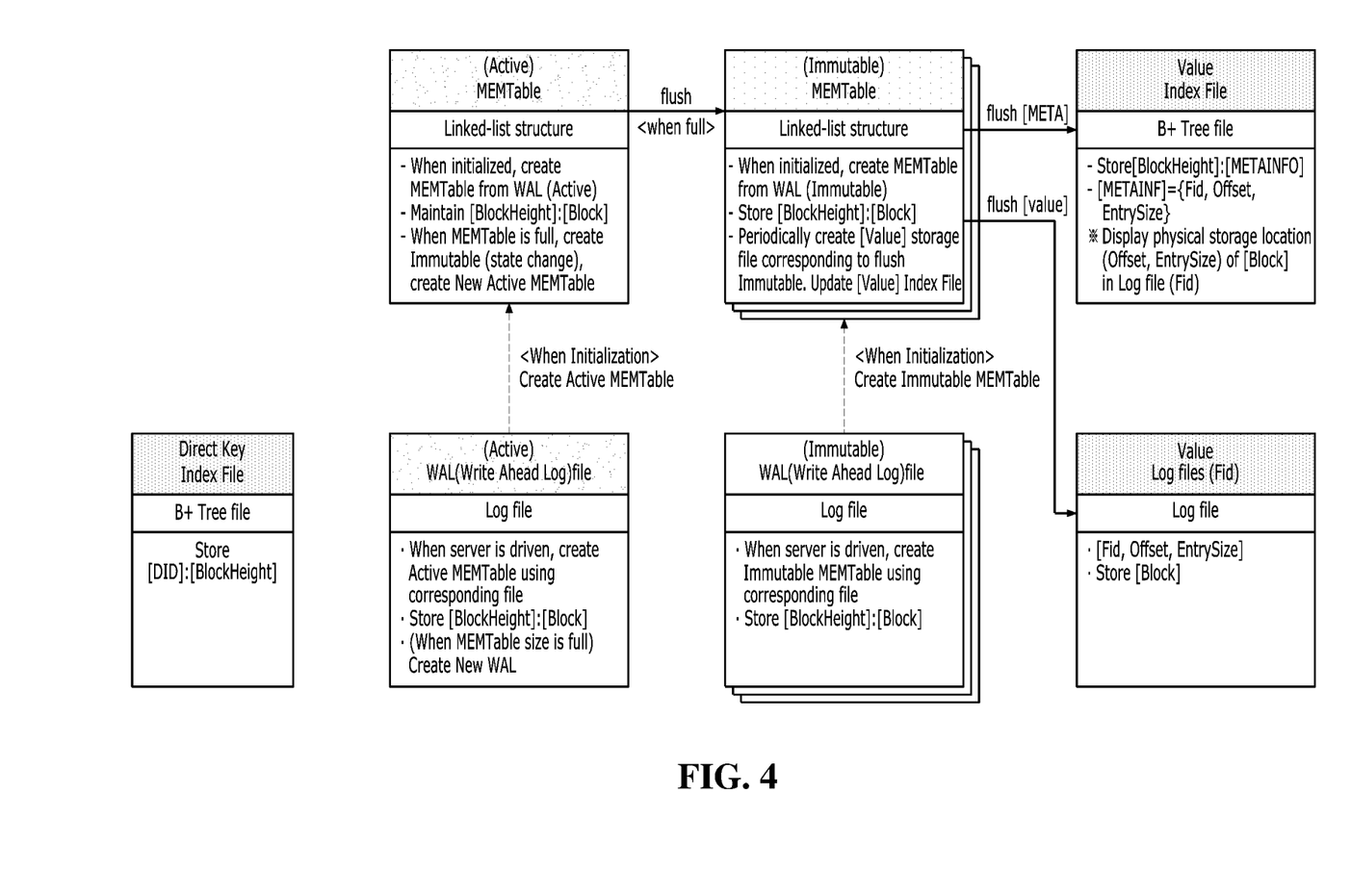

Referring to FIG. 4, the blockchain-based high-speed data processing device 10 may store the Key in a Direct Key Index file (DKI file). For example, the blockchain-based high-speed data processing device 10 may store [DID]:[BlockHeight] information in the Direct Key Index file (DKI file).

The blockchain-based high-speed data processing device 10 may create an Active MEMTable by using information on the WAL file of an Active state when the system is driven.

The blockchain-based high-speed data processing unit 10 may set a WAL file and a MEMTable of an Active state as much as a predetermined size to use an input value of <Internal indeX (IX)>:<Value> for writing and reading in real time.

The blockchain-based high-speed data processing device 10 may convert the state of the MEMTable to Immutable when the MEMTable of an Active state is full as much as the set size, create a WAL file of a new Active state, and create a new Active MEMTable by using information on the WAL file.

The blockchain-based high-speed data processing device 10 may redundantly store and maintain the same data [BlockHeight]:[Block] in a file (WAL file) and in the memory (MEMTable).

The blockchain-based high-speed data processing device 10 may create an Immutable MEMTable by using information on the WAL file of an Immutable state when the system is driven.

The blockchain-based high-speed data processing device 10 may create a Value Log file corresponding to the Immutable state and update the Value Index file through periodic flush.

The blockchain-based high-speed data processing device 10 may store the Value in the Value Log file of a Flushed state, and store the entry, which is search information of the Value, in the Value Index file together with the index (IX).

The blockchain-based high-speed data processing device 10 may store meta information [BlockHeight]: [METAINFO] of a block in the Value Index file of a B+ Tree data structure format. For example, the meta information ([METAINFO]={Fid, Offset, EntrySize}) may be information on the physical storage location (offset, EntrySize) of a block in the Value Log file (Fid).

The blockchain-based high-speed data processing device 10 may delete the MEMTable and the WAL file of an Immutable state after asynchronously transferring data to the Value Index file and the Value Log file.

Figure 5:
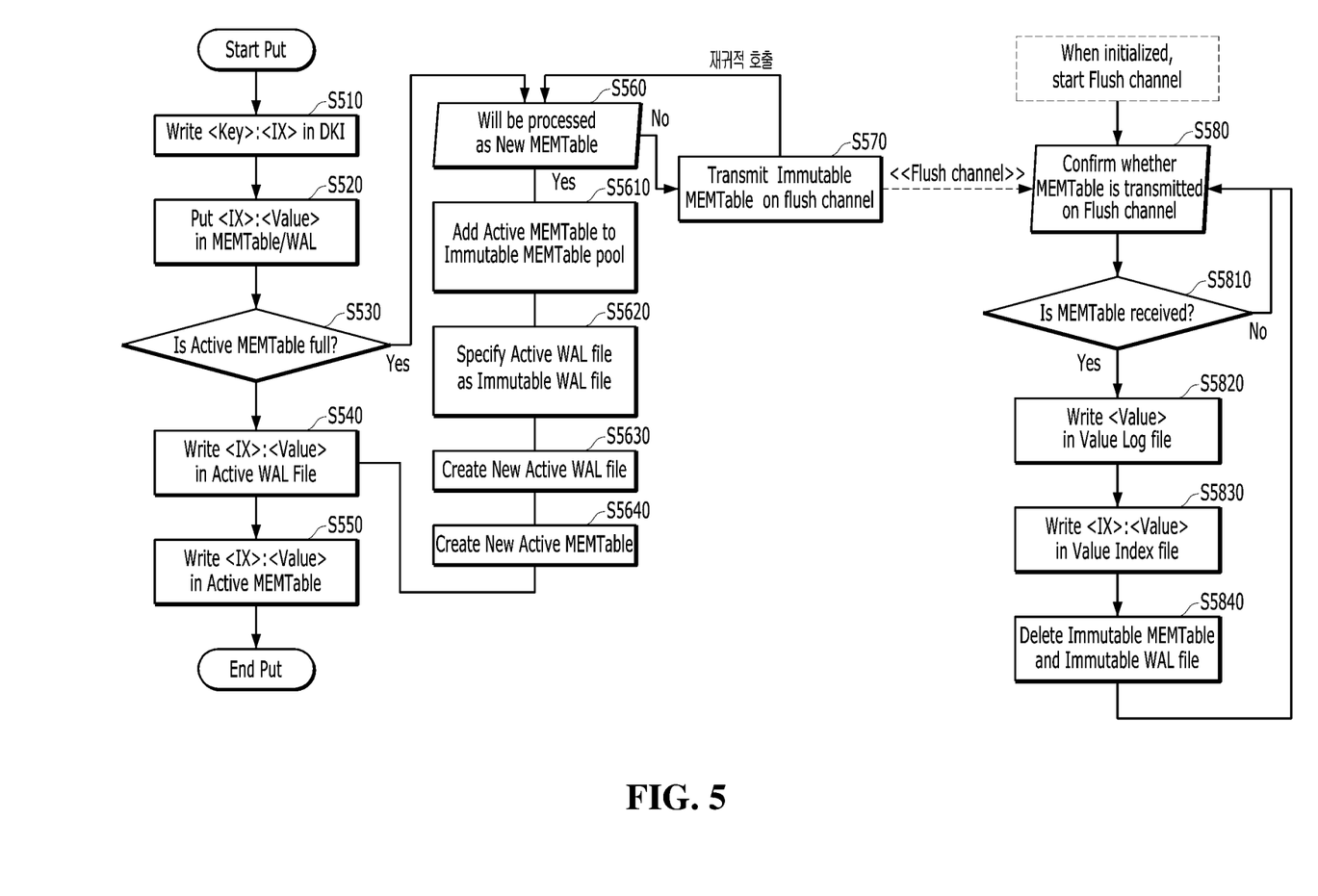

FIG. 5 is a flowchart illustrating a method of storing (Put) data by the blockchain-based high-speed data processing device 10 according to an embodiment of the present invention.

Here, put, write, and save are all interpreted as the same meaning to express that data is stored in a file.

Referring to FIG. 5, at step S510, the blockchain-based high-speed data processing device 10 may store (write) <Key>:<Index> into a Direct Key Index file (DKI file).

At step S520, the blockchain-based high-speed data processing device 10 stores (Put)<Index (IX)>:<Value> in MEMTable/WAL.

At step S530, the blockchain-based high-speed data processing device 10 may determine whether the Active MEMTable is full. When there is a space to store (write), the blockchain-based high-speed data processing device 10 performs step S540.

At step S540, the blockchain-based high-speed data processing device 10 stores (writes)<Index (IX)>:<Value> in the Active WAL file.

At step S550, the blockchain-based high-speed data processing device 10 stores (writes)<Index (IX)>: <Value> in the Active MEMTable.

When there is no space to store at step S530 as the Active MEMTable is full, the blockchain-based high-speed data processing device 10 performs step S560.

At step S560, the blockchain-based high-speed data processing device 10 may determine whether or not to process using a new MEMTable, and when a new MEMTable is required, step S5610 may be performed.

At step S5610, the blockchain-based high-speed data processing device 10 may change the state of the MEMTable from Active to Immutable and add the MEMTable to an Immutable MEMTable pool.

At step S5620, the blockchain-based high-speed data processing device 10 may also change the state of the WAL file to an Immutable state to specify the WAL file as an Immutable WAL file.

At step S5630, the blockchain-based high-speed data processing device 10 may create a new Active WAL file.

At step S5640, the blockchain-based high-speed data processing device 10 may create a new Active MEMTable.

In addition, the blockchain-based high-speed data processing device 10 may perform steps S5630 and S5640 at the same time.

The blockchain-based high-speed data processing device 10 may create a new Active MEMTable and a new WAL file and then perform step S540 of storing information in each file.

When a new MEMTable is not required at step S560, step S570 may be performed.

At step S570, the blockchain-based high-speed data processing device 10 may transmit the Immutable MEMTable on a Flush channel.

The blockchain-based high-speed data processing device 10 may confirm whether the MEMTable is transmitted on the Flush channel at step S580, and confirm whether the MEMTable is received at step S5810.

When the MEMTable is received at step S5810, the blockchain-based high-speed data processing device 10 may store (write) the Value in the Value Log file at step S5820.

At step S5830, the blockchain-based high-speed data processing device 10 may store (write)<Index (IX)>: <Value> in the Value Index file.

At step S5840, the blockchain-based high-speed data processing device 10 may delete the Immutable MEMTable and the Immutable WAL file.

Figure 6:
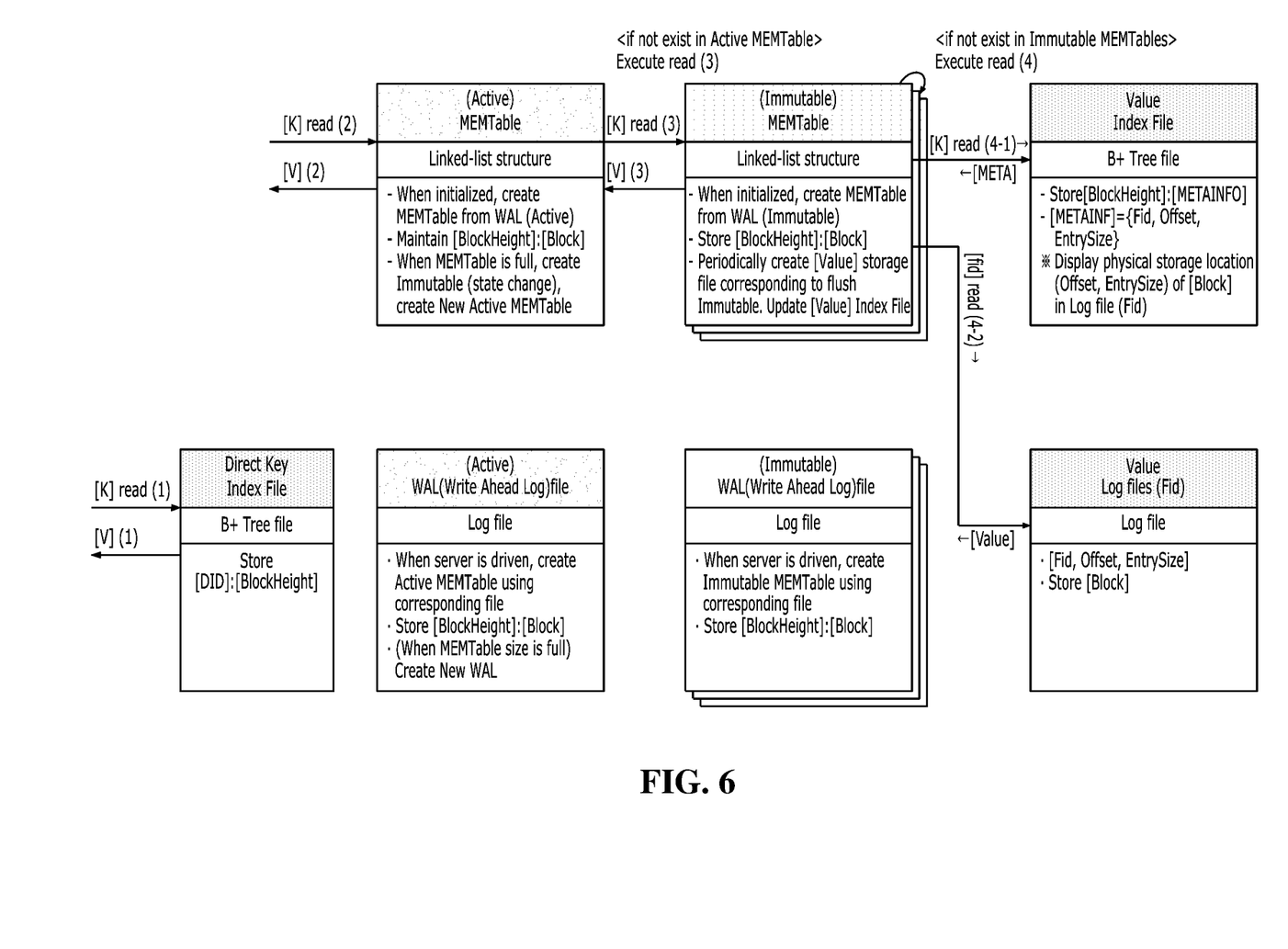

FIG. 6 is a view showing an example of a structure in which the blockchain-based high-speed data processing device 10 stores (puts) data according to an embodiment of the present invention.

The blockchain-based high-speed data processing device 10 may store the Key in a Direct Key Index file (DKI file). For example, the blockchain-based high-speed data processing device 10 may store [DID]:[BlockHeight] information in the Direct Key Index file (DKI file).

The blockchain-based high-speed data processing device 10 may redundantly store and maintain the same data [BlockHeight]:[Block] in a file (WAL file) and in the memory (MEMTable).

The blockchain-based high-speed data processing device 10 may change the state of the MEMTable from Active to Immutable and add it to an Immutable MEMTable pool.

The blockchain-based high-speed data processing device 10 may also change the state of the WAL file to an Immutable state to specify the WAL file as an Immutable WAL file.

The blockchain-based high-speed data processing device 10 may create a Value Log file corresponding to the Immutable state through periodic flush, and update the Value Index file.

The blockchain-based high-speed data processing device 10 may store the Value in the Value Log file of a Flushed state, and store the entry, which is search information of the Value, in the Value Index file together with the internal index (IX).

The blockchain-based high-speed data processing device 10 may store meta information [BlockHeight]: [METAINFO] of a block in the Value Index file of a B+ Tree data structure format. For example, the meta information ([METAINFO]={Fid, Offset, EntrySize}) is information on a physical storage location (offset, EntrySize) of a block in the Value Log file (Fid).

Figure 7:
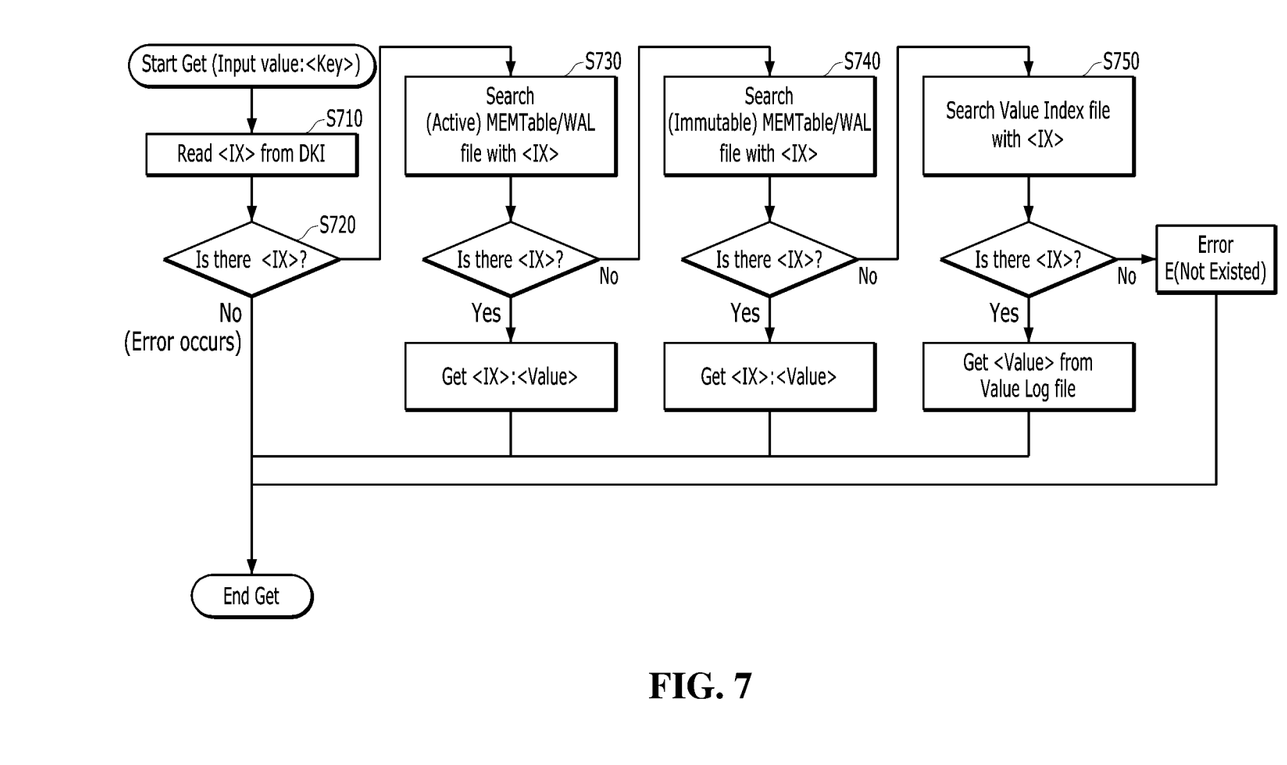

FIG. 7 is a flowchart illustrating a method of reading (Get) data by the blockchain-based high-speed data processing device 10 according to an embodiment of the present invention.

Referring to FIG. 7, the blockchain-based high-speed data processing device 10 may inquire (Get) a value corresponding to a <Key>:<Value> pair using the Key as an input value.

At step S710, the blockchain-based high-speed data processing device 10 finds the index (IX) of the input Key from the DKI file.

When the index (IX) does not exist at step S710, the blockchain-based high-speed data processing unit 10 determines that it is an error and terminates the process since it cannot find the Value. The blockchain-based high-speed data processing device 10 performs step S730 when there is an Index (IX) corresponding to the input Key.

When there is an <Index (IX)> in the MEMTable and the WAL file of an Active state at step S730, the blockchain-based high-speed data processing device 10 may read <Index (IX)>:<Value>. The blockchain-based high-speed data processing device 10 performs step S740 when there is no index (IX) in the MEMTable and the WAL file of an Active state.

When there is <Index (IX)> in the MEMTable and the WAL file of an Immutable state at step S740, the blockchain-based high-speed data processing device 10 may read <Index (IX)>:<Value>. The blockchain-based high-speed data processing device 10 performs step S750 when there is no <index (IX)> in the MEMTable and the WAL file of an Immutable state.

When there is an index (IX) in the Value Index file at step S750, the blockchain-based high-speed data processing device 10 may read the Value corresponding to the index (IX) from the Value Log file.

Figure 8:
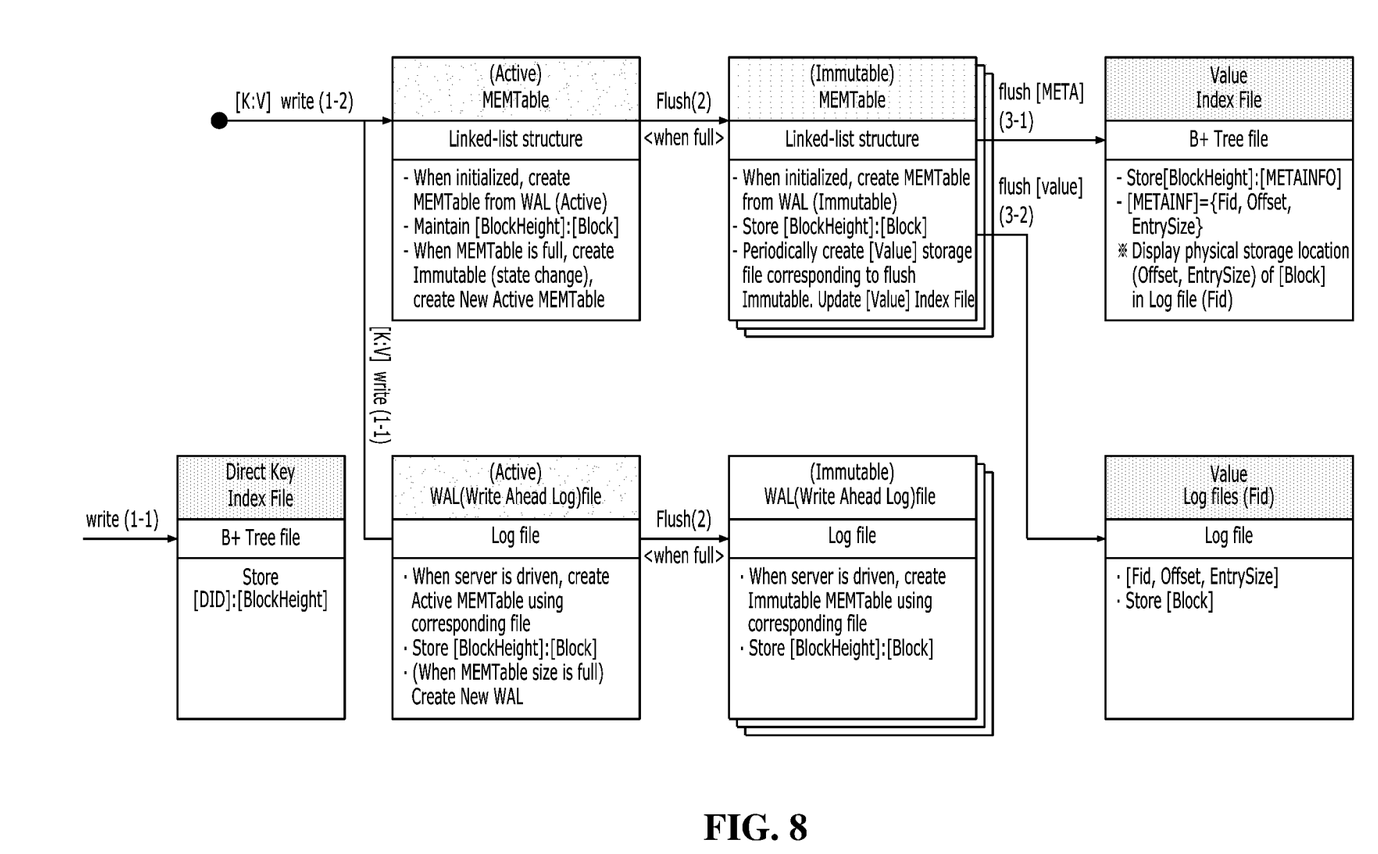

Referring to FIG. 8, the blockchain-based high-speed data processing device 10 may find the Key in the DKI file that is a B+ tree file, and acquire location information (Fid, offset, EntrySize) of the Value corresponding to the Key from the Value Index file. The blockchain-based high-speed data processing device 10 may inquire the Value corresponding to the input Key in a corresponding data structure by finding a Log file corresponding to the acquired location information Fid from the Value Log file, calculating an Offset of a predetermined method in the file, and reading data as much as the EntrySize.

According to an embodiment of the present invention, when <Key>:<Value> is stored, the final value is stored in a Log Structured Merge (LSM) tree data structure format, and the key used for storing the final value is separately stored in a B+ Tree data structure format, so that storage performance and reference (read) performance can be improved compared to those of conventional methods.

It should be understood that the effects of the present invention are not limited to the effects described above, and include all effects that can be inferred from the configuration of the invention described in the description or claims of the present invention.

The blockchain-based high-speed data processing method described above may be implemented as a computer-readable code on a computer-readable medium. The computer-readable recording medium may be, for example, a mobile recording medium (CD, DVD, Blu-ray disk, USB storage device, mobile hard disk) or a fixed recording medium (ROM, RAM, computer-equipped hard disk). The computer program recorded on the computer-readable recording medium may be transmitted to another computing device through a network such as the Internet or the like and installed in another computing device, and therefore may be used in another computing device.

Although all the components configuring the embodiments of the present invention are described as being combined in one piece or operating in combination, the technical spirit of the present invention is not necessarily limited to the embodiments. That is, within the scope of the objects of the present invention, all the components may operate by selectively combining one or more.

Although the operations are shown in a particular order in the drawings, it should not be understood that the operations should be performed in a specific order or a sequential order as shown in the drawings or all the operations shown in the drawings should be performed to obtain a desired result. In a specific situation, multitasking and parallel processing may be advantageous. Moreover, separation of the various components in the embodiments described above should not be construed as being necessarily required, and it should be understood that the described program components and systems may be generally integrated together into a single software product or packaged into a plurality of software products.

Until now, the present invention has been described focusing on the embodiments thereof. Those skilled in the art will understand that the present invention can be implemented in a modified form without departing from the essential characteristics of the present invention. Therefore, the disclosed embodiments should be considered in an illustrative viewpoint rather than a restrictive viewpoint. The scope of the present invention is shown in the claims rather than the above description, and all differences within the scope equivalent thereto should be construed as being included in the present invention.

DESCRIPTION OF SYMBOLS

10: Blockchain-based high-speed data processing device
100: Key management unit
200: Value management unit

What is claimed is:

1. A blockchain-based high-speed data processing device comprising:
at least one processor configured to manage <Key> of a <Key>:<Value> pair, and configured to store and manage <Value> of the <Key>:<Value> pair in a Value Log file,
wherein the at least one processor registers the <Key> and <Index (Internal indeX, IX)> in a Direct Key Index (DKI) file and stores the <Index (Internal indeX, IX)> in a Value Index file,
wherein the <Index (Internal indeX, IX)> includes Fid, Offset, and EntrySize, which are location information of the <Value> corresponding to the <Key>, finds <Index> from the Direct Key Index (DKI) file using the <Key>, finds location information of the <Value> from the Value Index file using the <Index>, finds Value Log file corresponding to the Fid of the location information of the <Value>, reads data as much as the EntrySize and inquires the <Value> after calculating the Offset of a predetermined method from the Value Log file, and
wherein the Direct Key Index (DKI) file and the Value Index file are in a B+ Tree data structure format, and the Value Log file is in an LSM tree data structure format.

2. A blockchain-based high-speed data processing method implemented by a blockchain-based high-speed data processing device, when performing read/write of <Key>: <Value>, a state is any one among Active state, Immutable state, and Flushed state, and the data processing method comprise:

- redundantly storing same data in a Write Ahead Log (WAL) file and memory as a MEMTable;
- setting the MEMTable and the WAL file of the Active state at a predetermined size;
- registering the MEMTable and the WAL file in an Immutable MEMTable and setting them to the Immutable state when a set size of the MEMTable of the Active state reaches full;
- asynchronously moving the MEMTable and the WAL file of the Immutable state to a Value Index file and a Value Log file and then deleting them;
- storing the <Value> in the Value Log file of the Flushed state and storing an Entry, which is search information of the <Value>, in the Value Index file together with an Index (Internal indeX, IX); and
- registering the <Key> and the <Index (Internal indeX, IX)> in a Direct Key Index (DKI) file,
- wherein the Direct Key Index (DKI) file and the Value Index file are in a B+ Tree data structure format, and wherein the Value Log file is in an LSM tree data structure format.

* * * * *